United States Patent [19]

Magenheim

[11] 4,060,212
[45] Nov. 29, 1977

[54] DEICING APPARATUS AND METHOD
[75] Inventor: Bertram Magenheim, Bethesda, Md.
[73] Assignee: System Development Corporation, Santa Monica, Calif.
[21] Appl. No.: 672,613
[22] Filed: Apr. 1, 1976
[51] Int. Cl.² .............................................. B64D 15/12
[52] U.S. Cl. .............................. 244/134 D; 324/585 B; 340/234
[58] Field of Search ........... 244/134 R, 134 D, 134 F; 219/10.55 R, 10.55 M; 340/234; 416/95; 324/58.5 B; 343/704

[56] References Cited
U.S. PATENT DOCUMENTS

| | | | |
|---|---|---|---|
| 1,819,497 | 8/1931 | Chisholm | 244/134 D |
| 2,317,019 | 4/1943 | Altemus | 244/134 D |
| 3,836,846 | 9/1974 | Overall et al. | 340/234 X |

Primary Examiner—Trygve M. Blix
Assistant Examiner—Barry L. Kelmachter
Attorney, Agent, or Firm—Fulwider, Patton, Rieber, Lee & Utecht

[57] ABSTRACT

A system for effecting the removal of ice from external surfaces of aircraft, and particularly from helicopter rotor blades, by the transmission of microwave electromagnetic energy into the ice so that it functions as a surface waveguide. The system includes a permanent surface waveguide with a dielectric constant close to that of ice, so that a composite surface waveguide is formed. The permanent surface waveguide is formed from a characteristically low-loss material, so that the microwave energy is dissipated as heat primarily in the ice layer, thereby very efficiently melting or heating the ice.

10 Claims, 13 Drawing Figures

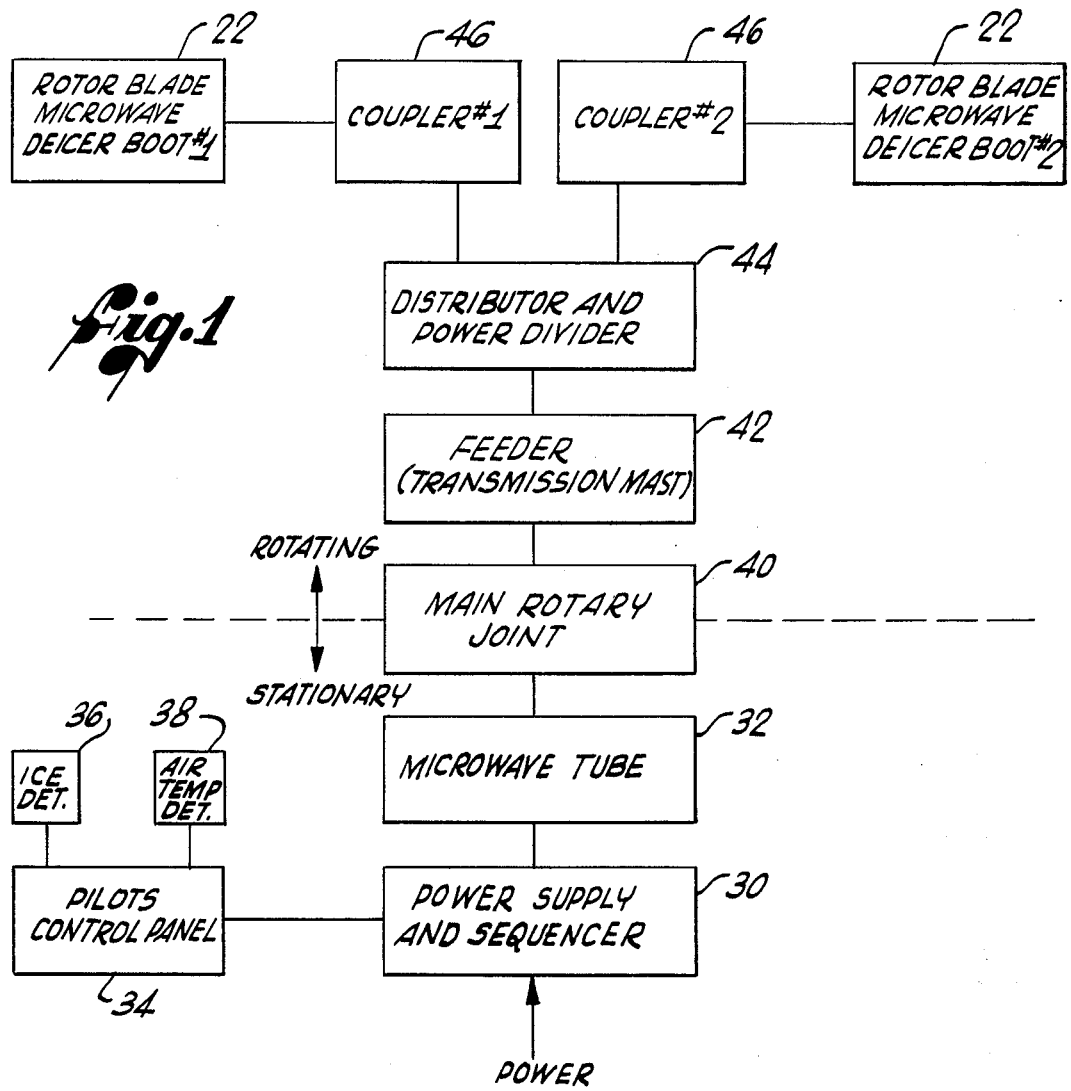
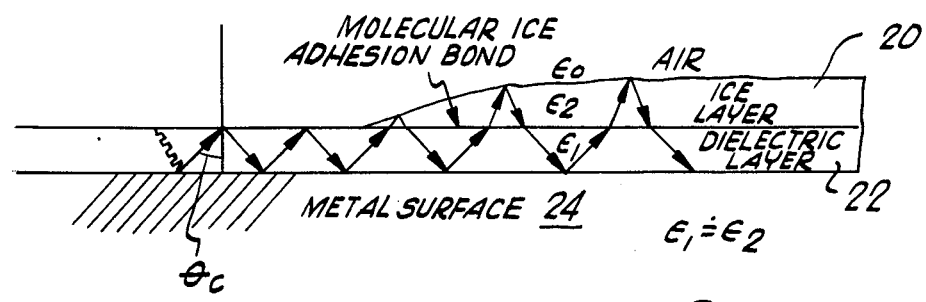

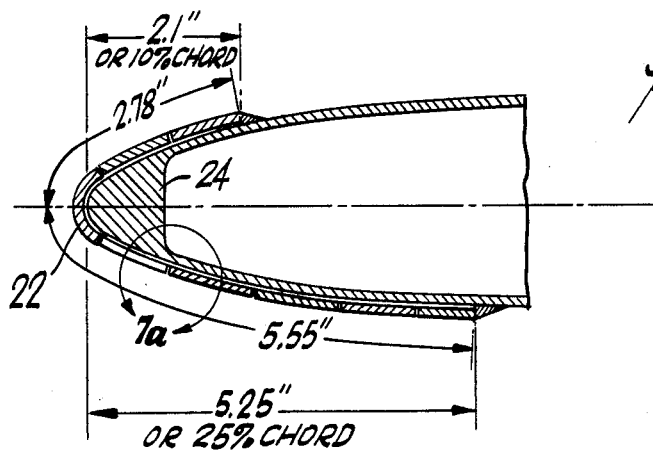
Fig. 6
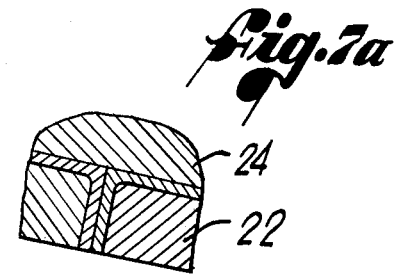
Fig. 7a
Fig. 8
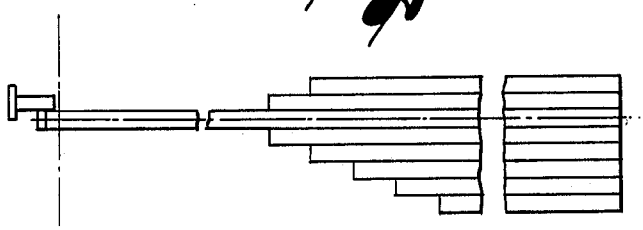
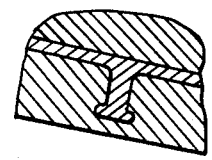
Fig. 7b
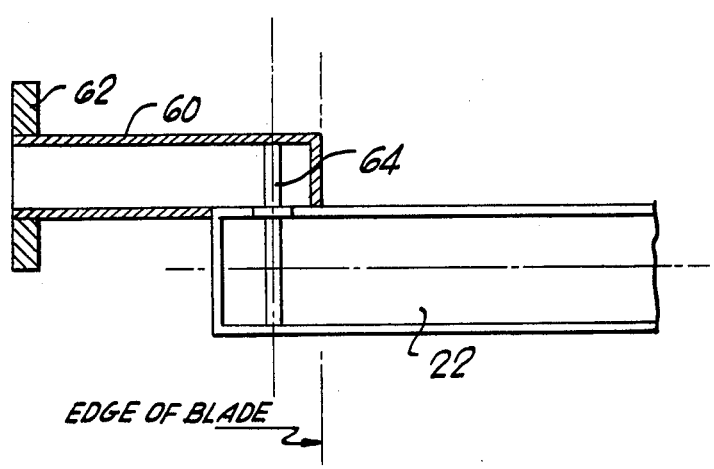
Fig. 9
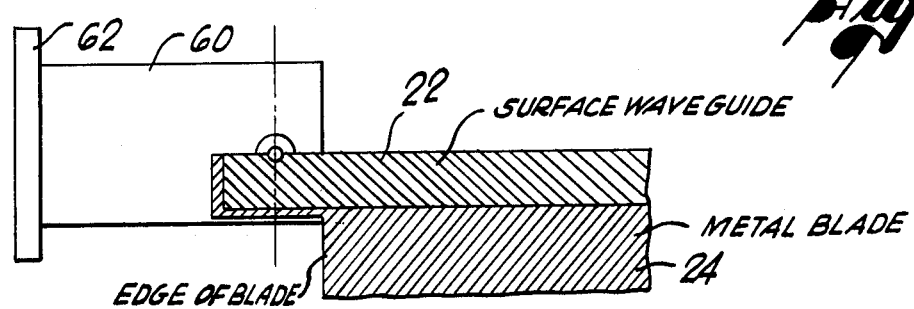
Fig. 10

DEICING APPARATUS AND METHOD

BACKGROUND OF THE INVENTION

The present invention relates generally to aircraft deicing systems, and, more particularly, to deicers for use in helicopters.

The problems relating to the formation of ice on aircraft are well known, and date from the early days of aviation. In certain climatic conditions, ice has a tendency to form, especially in the vicinity of the leading edges of airfoil surfaces, in sheets of substantial thickness. The ice not only increases the effective weight of the aircraft, but it can also increase drag resistance and reduce the lift provided by the airfoil.

Various techniques have been employed in the past in an attempt to avoid the problem of aircraft icing. Early deicing devices were mechanical, some employing an inflatable cover or boot to crack the ice layer. Other prior art deicers employ electric resistance heating elements buried beneath the airfoil surfaces. The principal problem with these is that they heat a large section of airfoil surface, whether covered with ice or not. Since the surface is typically a metal and a good conductor of heat, deicers employing resistance heating are extremely inefficient, use a large amount of electrical power, and are typically heavy and quite costly. Moreover, the heating elements are not conveniently replaceable in the event of wear or damage.

Helicopters are, of course, just as prone to icing problems as fixed-wing aircraft. In fact, helicopters are probably more likely to be used in icing conditions than are fixed-wing aircraft. In addition, there is a practical difficulty in supplying deicing power to a rotating surface, rather than to one which is fixed relative to the body of the aircraft. Because of the aforementioned problems of inefficiency, high power and weight requirements, and unreliability of electric resistance deicing devices, until now there has been no satisfactory deicing system for helicopter use.

It will be apparent from the foregoing that there is a clear need for a deicing technique which avoids or minimizes the disadvantages of the prior art, and which is particularly useful for helicopter use. The present invention fulfills this need.

SUMMARY OF THE INVENTION

The present invention resides in aircraft deicing apparatus, and a related method for its use, in which microwave electromagnetic energy is transmitted into a surface layer of ice, and is dissipated in the ice as heat, melting the ice layer, or at least raising its temperature, in a very efficient manner. Basically, and in general terms, the apparatus of the invention includes means for generating microwave electromagnetic energy, distribution means for transmitting the microwave energy to a surface of the aircraft on which ice can form, and coupling means, for coupling the microwave energy for transmission into the surface layer of ice in such a manner as to propagate the energy through the ice layer acting as a surface waveguide. The energy is dissipated as heat, and the ice is melted, or is at least sufficiently heated to break its adhesion bond with the surface of the aircraft.

In accordance with another aspect of the invention, the apparatus includes a dielectric surface layer over the area to be deiced, for coupling the microwave energy to the ice layer. The thickness of the dielectric surface layer is chosen such that, in the ice-free condition, a loosely bound surface wave may propagate down it with only minor losses. As the ice accumulates on the dielectric layer, a composite waveguide of increasing thickness is formed, and the surface wave becomes more tightly bound and undergoes higher losses, principally in the more lossy ice material.

The method of the invention includes the steps of generating microwave electromagnetic energy, transmitting the energy to the surface to be deiced, coupling it to a dielectric surface layer on the surface to be deiced, and thereby melting the ice with heat dissipated therein during transmission of the microwave energy through the ice layer.

As it relates to deicing techniques for helicopter use, the apparatus of the present invention includes distribution means for transmitting the microwave energy from the body of the helicopter to each of two rotatable rotor blades. This particular distribution means includes a rotary joint, a feeder rotating in the same axis as the rotor blades, a power divider for receiving power from the feeder and splitting it into approximately equal portions, and flexible transmission means connecting the power divider to the rotor blades.

It will be appreciated from the foregoing that the present invention represents a substantial advance in aircraft deicing techniques. In particular, it provides a deicer having a lower power consumption, lower weight, and lower cost than deicers available heretofore. Moreover, the deicer of the present invention is more reliable and easier to maintain than deicers of the prior art. Other aspects and advantages of the present invention will become apparent from the following detailed description taken in conjunction with the accompanying drawings.

BRIEF DESCRIPTION OF THE DRAWINGS

FIG. 1 is a simplified block diagram of the deicing system of the present invention, as applied to a helicopter;

FIG. 2 is a diagrammatic representation of the transmission of microwave energy through a dielectric layer and an ice layer on an aircraft surface;

FIG. 6 is a fragmentary transverse cross-sectional view of a rotor blade, showing a segmented surface waveguide construction;

FIGS. 7a and 7b show alternate forms of a construction utilized in joining adjacent segments of the surface waveguide;

FIG. 8 is a development of an alternate form of the surface waveguide;

FIG. 9 is an elevational view, partly in section, of a coupler used to transmit microwave energy into the surface waveguide;

FIG. 10 is a plan view, partly in section, corresponding to the elevational view of FIG. 9;

DESCRIPTION OF THE PREFERRED EMBODIMENTS

Figure 3:
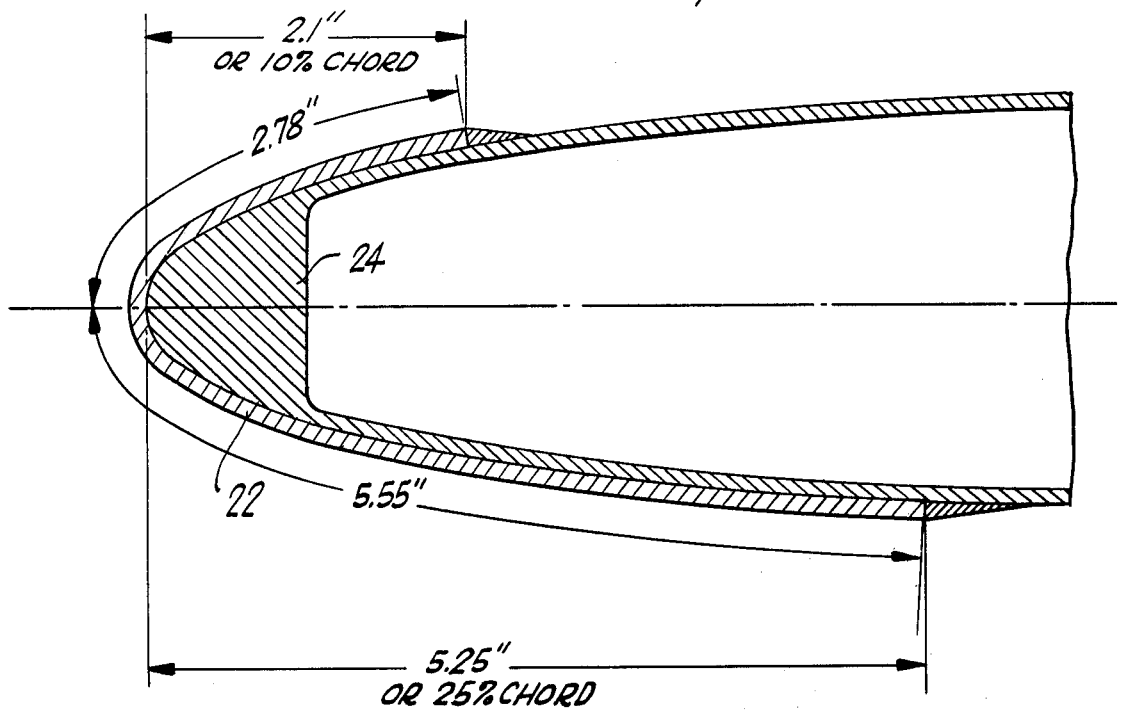
FIG. 3 is a fragmentary cross-sectional view taken transversely through a helicopter rotor blade and showing a surface waveguide formed on the rotor blade surface.

As shown in the drawings for purposes of illustration, the present invention is principally concerned with a novel technique for the removal of ice layers formed on exterior surfaces of aircraft, particularly airfoil surfaces. The invention now to be described in detail by way of example is specifically designed for the removal of ice from helicopter rotor blades. Until now, no completely satisfactory technique for deicing helicopter rotor blades has been available. In accordance with the present invention, microwave electromagnetic energy is transmitted into an ice layer, indicated by reference numeral 20 in FIG. 2, in such a manner that the angle of incidence of the transmitted energy on the air-ice interface is greater than the critical angle above which total internal reflection occurs. The microwave energy is dissipated as heat, primarily in the ice layer 20, thereby melting the ice sufficiently to allow centrifugal forces to break its adhesion bond with the rotor blade.

Since a very thin layer of ice would be incapable of transmitting microwave energy, a permanent dielectric layer 22 is formed on the surface 24 to be deiced. The material selected for the dielectric 22 has a dielectric constant approximately equal to that of the ice layer. As shown in FIG. 2, the microwave energy will be totally internally reflected at the air-ice interface and the interface between the dielectric layer 22 and the rotor blade surface 24, and will be only slightly refracted at the interface between the ice layer 20 and the dielectric layer. The dielectric layer 22 can be of a material which is almost completely lossless for all practical purposes. The ice layer 20, on the other hand, will normally contain many impurities, including a large proportion of unfrozen water, and will therefore rapidly attenuate the microwave energy, which will be dissipated in the ice layer as heat. It will be appreciated that this technique has exactly the desired effect, i.e., the microwave energy is dissipated as heat primarily in the ice layer alone, and little or no heat is wasted in the dielectric layer 22 or the surface 24 of the rotor blade. For deicing of helicopter rotor blades, the ice layer 20 does not have to be raised above its melting point, but only above a shed temperature above which the adhesion bond between the ice layer 20 and the dielectric layer 22 can be broken by centrifugal forces acting on the ice layer as the rotor blades are rotated.

Waveguides taking the form of closed tubes of cylindrical or rectangular cross-section are well known. Less familiar is the concept of an "open boundary" structure for guiding an electromagnetic wave along a surface. Such a structure is capable of supporting waves which are intimately bound to the surface of the waveguide. While electric or magnetic fields persist outside the surface waveguide, they are characterized by an exponential rate of decay in a direction normal to the surface.

The propagation of electromagnetic waves in a surface waveguide can be conveniently defined in terms of wave solutions to Maxwell's equations, but these detailed theoretical considerations are not believed to be necessary to an understanding of the invention. The theory of surface waveguides is elaborated on in a number of reference works, including: R. Colin, *Field Theory of Guided Waves*, McGraw-Hill, New York (1960); and Ramo, Whinnery and Van Duzer, *Fields and Waves in Communication Electronics*, John Wiley Sons, New York (1965). The possible modes of waves propagation which may be utilized in helicopter deicing are transverse-magnetic and transverse-electric waves referred to as the $TM_0$, $TM_1$, $TE_0$ and $TE_1$ modes.

As shown in FIG. 1, the deicing apparatus of the invention as used for deicing helicopter rotor blades includes a power supply and sequencer 30, for supplying power and control signals to a microwave tube 32 installed in the fuselage of the helicopter (not shown). Also included is a pilot's control panel 34 coupled with the power supply and sequencer 30, and also coupled to an ice detector 36 and an air temperature detector 38. The apparatus can be adapted for manual operation from the pilot's control panel 34, based on the pilot's observation of the ice detector 36 or the air temperature detector 38. Alternatively the apparatus can be adapted for automatic operation in response to the detection of ice by the ice detector 36, with a provision for optionally overriding the automatic operation of the apparatus.

The microwave tube 32 is a conventional microwave oscillator, such as a magnetron or klystron type of tube, and the power supply 30 is a conventional one for such a tube. The operating frequency of the tube 32 can be selected in accordance with design requirements and relevant governmental restrictions on microwave transmitters. Typically, the frequency can be anywhere in the range 2,000 megahertz to 22,000 megahertz. Operation at higher frequencies may dictate the selection of different microwave distribution components, as will be discussed. Another factor which may dictate the selection of the operating frequency is the elimination or minimization of radiation of microwave energy from the helicopter. Higher frequencies undergo heavier attenuation in icing atmospheric conditions, and may therefore be more desirable for some military aircraft.

The output of the microwave tube 32 is transmitted through a main rotary joint 40 (FIG. 1), which couples the microwave energy to a rotatable feeder 42 located in the axis of the rotor blades and rotatable with the blades. The feeder 42 transmits the microwave energy up from the fuselage of the helicopter to the hub of rotation of the rotor blades, where a distributor and power divider 44 splits the energy into two practically equal components for distribution to the two diametrically opposed rotor blades. The main rotary joint 40 and feeder 42 are similar to conventional components utilized in radar transmission systems. The distributor and power divider 44 comprises conventional microwave distribution elements for splitting and distributing the microwave energy to the two rotor blades. For relatively low microwave frequencies, up to 5 or 6 megahertz, a coaxial line divider and distribution system could be used, but for higher frequencies, for example at 22,000 megahertz, a waveguide divider would be required.

As will be appreciated, the rotor blades of helicopter, in addition to being rotatable to provide lift and forward thrust to the helicopter, are movable about other axes to perform various control functions. Consequently, the microwave energy has to be distributed by some means which allows for these additional movements of the rotor blades. Again, for relatively low microwave frequencies, distribution from the hub of the rotor assembly to the rotor blades themselves can be effected by means of coaxial cables from a conventional T-section coaxial divider. For higher microwave frequencies, coaxial distribution may not be practicable, and waveguide rotary joints may be required to transmit the microwave energy to the rotor blades.

As further shown in FIG. 1, the apparatus of the invention also includes two couplers 46 which receive distributed power from the distributor and power divider 44, and which couple the microwave energy to two rotor blade microwave deicer boots 22 formed from the dielectric layer referred to in connection with FIG. 2.

Figure 5:
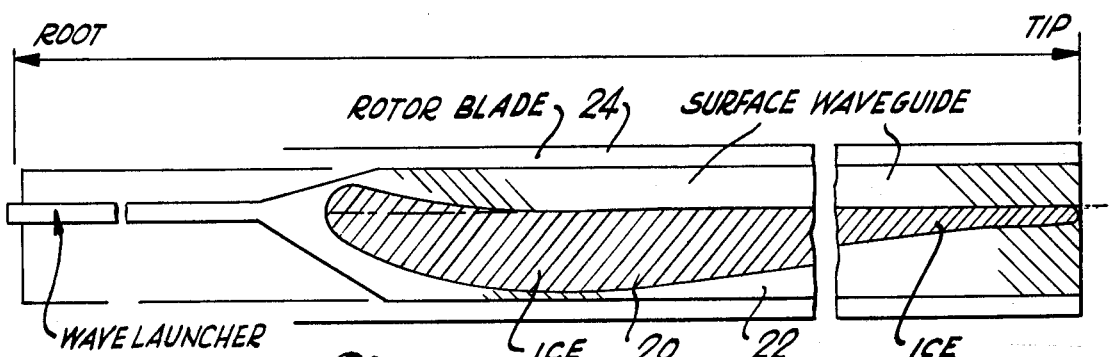
FIG. 5 is a fragmentary front elevational view of the surface waveguide, showing a typical formation of ice thereon.

As shown in the cross-sectional view of a rotor blade in FIG. 3, which includes typical dimensions, each of the boots 22 forms a surface layer over a substantial portion of the rotor blade 24 in the vicinity of its leading edge. The boot 22 covers approximately ten percent of the chord width of the rotor blade on its upper surface, and approximately 25 percent of the chord width of the rotor blade on its lower surface. These proportions are not, of course, critical to the invention, but are consistent with the typical pattern of ice formation on a rotor blade, as shown in FIG. 5. The ice layer 20 tends to form further across the width of the blade on its lower surface that on its upper surface. The upper and lower edges of the boot 22 are beveled to make a smooth transition with the rotor blade surface 24.

Figure 4:
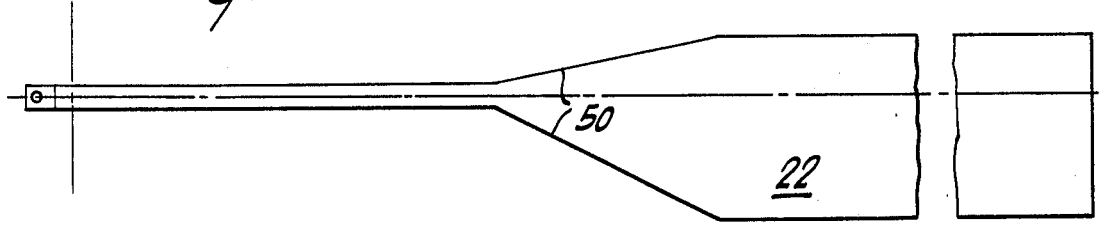
FIG. 4 is a development of the surface waveguide shown in FIG. 3.

As shown in the development of the boot 22 in FIG. 4, each boot has a relatively narrow-width strip along the leading edge of the rotor blade at the root end of the blade, and then increases gradually to its full width as shown at 50. The material used for the boots 22 must be selected not only for its dielectric properties, i.e., for a dielectric constant approximately equal to that of ice, and a relatively low loss tangent compared with that of ice, but also for its ability to withstand severe rain, sand and dust erosion encountered by the rotor blades. Suitable materials are alumina; an ultra-high molecular weight polyethylene such as one sold under the trademark LENNITE; high quartz fiber silicone resin laminates; fused quartz; or epoxy glass or silicone glass laminates. In addition a polyurethane erosion coat, of approximately 0.012 inch thickness, may be used as an erosion coat over some of these materials. The dielectric properties of polyurethane make it unsuitable for use alone as a boot material. Since the portions of the boot 22 closer to the blade tip will be subject to more severe erosion due to the higher speed and higher angle of impingement of eroding particles, these outer portions may be fabricated from a material such as alumina, with the remaining portions of the boot made from a different material, such as polyethylene.

Typically, nickel erosion shields are now used on helicopter rotor blades. Use of alumina or polyethylene shields for deicing purposes results in an additional benefit of a substantial weight saving over conventional nickel erosion shields.

As shown in FIGS. 6, 7a, and 7b, the boot 22 may be fabricated as a plurality of extruded strips of material, the strips being joined by any suitable structural means, two alternatives being shown in FIGS. 7a and 7b. The extruded strips operate to supress transverse-magnetic waves of the $TM_0$ mode in the boot 22 acting as a surface waveguide, and also provide a polarization anchor for transverse-electric waves of the $TE_1$ mode. The extruded strip construction also provides a convenient means for fastening the boot 22 to the blade surface 24. FIG. 8 shows a developed view of the same boot 22 suitable for operation in the $TE_1$ mode. Rather than being uniformly tapered to its full width, the boot is expanded to its full width by incremental steps corresponding to the separate extrusions shown in FIG. 6.

FIGS. 9 and 10 show one form of a coupler 46 used to couple the microwave energy to the boot or waveguide 22. The coupler 46 comprises a hollow rectangular waveguide 60 having a flange 62 on one end thereof for coupling the waveguide to the distributor and power divider 44 (FIG. 1) by conventional means. The waveguide 60 is closed at its other end except for a pin of circular cross-section projecting from one sidewall of the waveguide and out through a coupling aperture in the opposite sidewall, to overlie and be partly embedded in the boot material 22. The coupler illustrated in FIGS. 9 and 10 is suitable for coupling $TE_1$ mode microwave energy to the surface waveguide 22.

Figure 11:
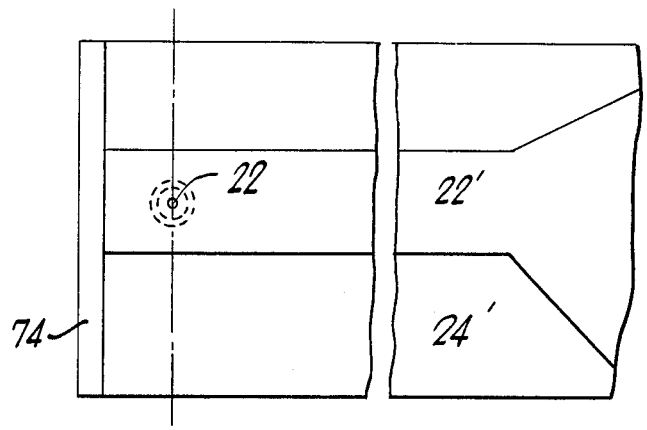
FIG. 11 is an elevational view of an alternate coupler used to transmit microwave energy into the surface waveguide.
Figure 12:
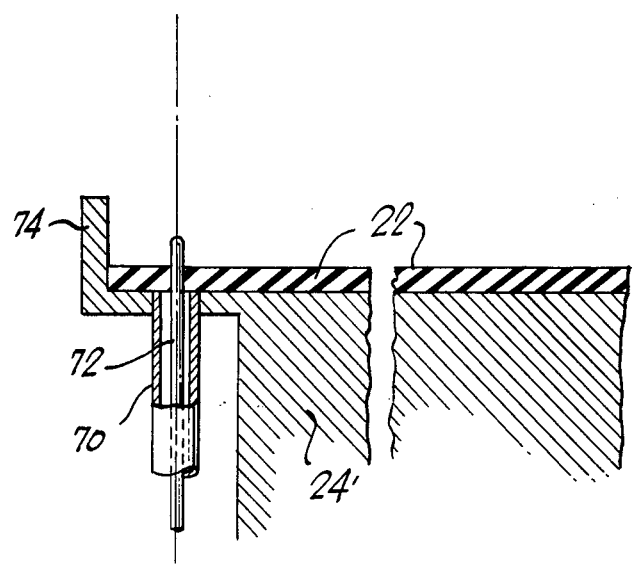
FIG. 12 is a plan view, partly in section, corresponding to the elevational view of FIG. 11.

FIGS. 11 and 12 show an alternate form of coupler 46 used to couple $TM_0$ mode energy to the surface waveguide formed by the boot 22. The coupler shown in FIGS. 11 and 12 includes a coaxial waveguide, a portion of which is shown at 70, having a central conducting pin 72 which extends through a portion of the metal blade surface 27', through the overlying dielectric material 22', and which projects substantially above the outer surface of the dielectric material. A portion 74 of the metal surface 24' is bent at right angles to form a reflecting plate on the root side of the projecting rod 72.

It will be appreciated from the foregoing that the present invention represents a substantial advance in the field of aircraft deicing systems. In particular, the invention provides a method and means for deicing airfoil surfaces, such as helicopter rotor blades, using microwave energy to melt the ice or raise its temperature sufficiently to break its adhesion bond with the rotor surface. A boot of dielectric material over the surface to be deiced permits the removal of even very thin layers of ice. It will also be appreciated that, although the invention has been described with reference to specific embodiments for deicing helicopter rotor blades, the invention may also be used on fixed-wing aircraft, and that various modifications may be made without departing from the spirit and scope of the invention. Accordingly, the invention is not to be limited except as by the appended claims.

I claim:
1. Aircraft deicing apparatus, comprising:
    means for generating microwave electromagnetic energy;
    distribution means for transmitting the microwave energy to a surface to be deiced; and
    coupling means, for coupling the microwave energy from said distribution means to a surface layer of ice, said coupling means being configured to transmit the microwave energy through the ice layer in the manner of a surface waveguide, whereby substantially all of the energy is dissipated as heat primarily in the ice layer, thereby raising the temperature of the ice layer sufficiently to effect removal of the ice layer from the aircraft.

2. Helicopter rotor blade deicing apparatus, for removing ice from a plurality of rotor blade airfoil surfaces, said apparatus comprising:
    a source of microwave electromagnetic energy located in the helicopter;
    feeder means rotatable with the helicopter rotor blades, for transmitting the microwave energy along the axis of rotation of the blades;

a rotary joint for transmitting the microwave energy into said rotatable feeder means;

power divider means coupled with said feeder means, for dividing the microwave energy into a plurality of substantially equal portions;

distribution means for transmitting the equal portions of microwave energy to the vicinity of the rotor blades; and coupling means for coupling the microwave energy for propagation into a surface ice layer on the rotor blades, thereby heating and effecting removal of the ice.

3. Helicopter rotor deicing apparatus as set forth in claim 2, and further including a surface waveguide of dielectric material installed on each rotor blade airfoil surface to be deiced, said coupling means being arranged to transmit the microwave energy into the surface waveguide alone when no ice is present, and said surface waveguide having a dielectric constant close to that of ice and having a relatively low dielectric loss characteristic, to provide for dissipation of the microwave energy primarily in the ice layer.

4. Helicopter rotor deicing apparatus as set forth in claim 3, wherein said surface waveguide extends over a substantial portion of the leading edge of each rotor blade airfoil surface, and functions as an erosion shield as well as a surface waveguide for deicing.

5. A method of deicing external surfaces of aircraft, comprising the steps of:

generating microwave electromagnetic energy;

transmitting the microwave energy to the vicinity of a surface to be deiced; and coupling the microwave energy to a surface layer of ice for propagation therein in the manner of a surface waveguide, thereby heating and effecting removal of the ice while dissipating substantially all of the energy as heat in the ice layer.

6. A method of deicing helicopter rotor blades, comprising the steps of:

generating microwave electromagnetic energy on board a helicopter;

transmitting the microwave energy along a feeder rotatable with the rotor blades;

dividing the microwave energy into a plurality of approximately equal portions;

distributing the equal portions to the vicinities of the respective rotor blades;

coupling the equal portions to surface waveguides installed on the rotor blade surfaces, for propagation through the surface waveguides and ice layers together acting as composite waveguides; and thereby raising the temperature of the ice and thereby effecting removal of the ice from the rotor blades by centrifugal force.

7. Aircraft deicing apparatus, comprising:

means for generating microwave electromagnetic energy;

distribution means for transmitting the microwave energy to a surface to be deiced;

coupling means, for coupling the microwave energy from said distribution means to a surface layer of ice, whereby the energy is dissipated as heat primarily in the ice layer, thereby raising the temperature of the ice layer sufficiently to effect removal of the ice layer from the aircraft; and a surface waveguide of material having a dielectric constant close to that of ice, said surface waveguide being formed on the surface to be deiced, whereby even extremely thin layers of ice can be removed by the transmission of the microwave energy into said surface waveguide and the ice together acting as a composite waveguide.

8. Aircraft deicing means as set forth in claim 7, and further including control means for activating said means for generating microwave electromagnetic energy in response to the detection of ice on the aircraft surface.

9. A method of deicing external surfaces of aircraft, comprising the steps of:

generating microwave electromagnetic energy;

transmitting the microwave energy to the vicinity of the surface to be deiced; and coupling the microwave energy to a surface layer of ice for propagation therein in the manner of a surface waveguide, thereby heating and effecting removal of the ice, said coupling step including coupling the microwave energy to a permanent surface waveguide installed on the surface to be deiced, to permit propagation of the microwave energy even into very thin layers of ice.

10. A method as set forth in claim 9, and further including the step of switching the microwave energy on the off in response to the detection of a layer of ice.

* * * * *